S. STEWART.
MOTOR VEHICLE.
APPLICATION FILED NOV. 18, 1910.
1,000,853.
Patented Aug. 15, 1911.
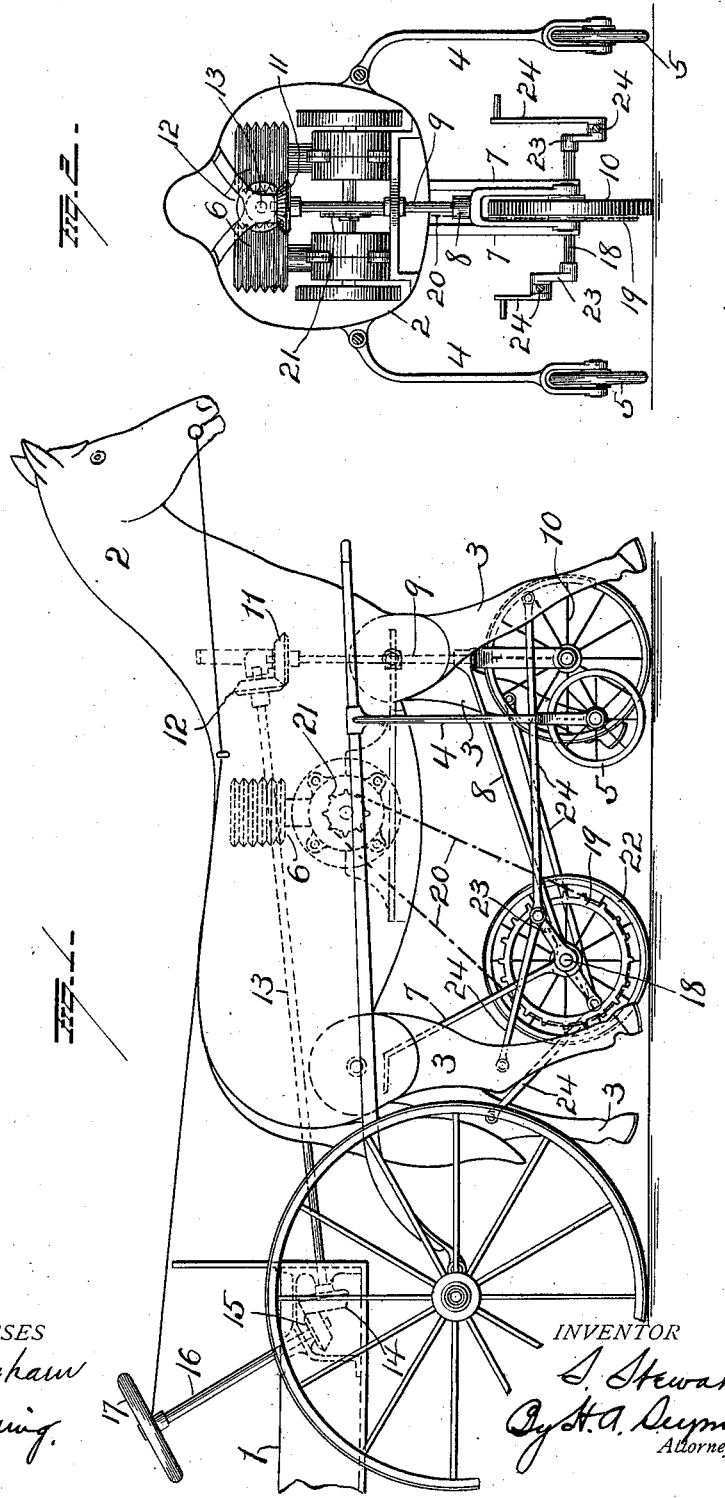
WITNESSES
E. Nottingham
G. F. Downing
INVENTOR
S. Stewart
By H. A. Seymour
Attorney

UNITED STATES PATENT OFFICE.

SEYMOUR STEWART, OF SAVANNAH, GEORGIA.

MOTOR-VEHICLE.

1,000,853.  Specification of Letters Patent.  Patented Aug. 15, 1911.

Application filed November 18, 1910. Serial No. 593,038.

*To all whom it may concern:*

Be it known that I, SEYMOUR STEWART, of Savannah, in the county of Chatham and State of Georgia, have invented certain new and useful Improvements in Motor-Vehicles; and I do hereby declare the following to be a full, clear, and exact description of the invention, such as will enable others skilled in the art to which it appertains to make and use the same.

This invention relates to improvements in motor vehicles and more particularly to the mechanical horse type,—the object of the invention being to provide a simple and efficient machine having the outward appearance of a horse and to so construct the machine that the legs of the horse shall be caused to operate in a manner resembling the movements of a natural horse in the act of pacing.

With this and other objects in view the invention consists in certain novel features of construction and combinations of parts as hereinafter set forth and pointed out in the claims.

In the accompanying drawings, Figure 1 is a side elevation, partly broken away, showing a motor vehicle embodying my improvements, and Fig. 2 is a transverse sectional view.

1 represents a vehicle, such as a carriage, with the forward end of which is connected through the medium of thills or otherwise, a hollow frame or casing 2 having the configuration of a horse provided with legs 3 which are hinged or pivotally connected with the body portion of said hollow frame or casing.

Near the forward end of the frame or casing 1, arms 4 are secured thereto and depend therefrom in such manner as to be disposed laterally from respective sides of said frame or casing and the lower ends of these arms are bifurcated and provided with suitable bearings for the journals of wheels 5 to be normally disposed short distances above the ground and adapted to prevent excessive lateral tipping of the horse.

The frame or casing 1 which constitutes the representation of a horse is preferably made of metal and has mounted therein, a motor 6 of any preferred form of construction. Brackets or braces 7 depend from the frame or casing 1 and similar braces 8 extend from the lower ends of the braces 7 forwardly and are constructed at their forward ends with a bearing for a vertical shaft 9. The shaft 9 is provided at its lower end with suitable bearings for the journals of a steering wheel 10 and the upper end of said shaft terminates within the hollow frame or casing 1, where it is provided with a beveled pinion 11 to receive motion from a pinion 12 on one end of a shaft 13. The shaft 13 is mounted in suitable bearings and extends rearwardly to the forward end of the vehicle body, where it is provided with a beveled pinion 14 to receive motion from a similar pinion 15 carried by the shaft 16 of a steering wheel 17. It is apparent that by turning the wheel 17, motion will be transmitted through the gearing above described to the wheel 10 for changing the angle of the latter to steer the machine.

At the juncture of the braces 7—8, bearings are formed for the accommodation of a shaft 18 to which a sprocket wheel or pulley 19 is secured for the reception of a driving chain or belt 20 whereby motion is transmitted to said shaft from a wheel or pulley 21 on the shaft of the motor 6. A traction wheel 22 is also secured to the shaft 15 and this shaft also carries a series of crank arms 23 which are connected, respectively, by means of rods or pitmen 24 with the hinged or pivoted legs 3 of the horse.

It will be apparent that when the motor 6 is operated, motion will be imparted, not only to the traction wheel 22 but also to the legs of the horse, causing said legs to oscillate as in pacing.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

1. In a motor vehicle of the character described, the combination with a hollow frame or casing provided with oscillatory legs and having the configuration of a horse, of a single crank shaft, means supporting said crank shaft centrally below the rear portion of the hollow frame or casing, a traction wheel secured to said shaft, pitmen connecting both the fore and aft oscillatory legs of the horse with said single crank shaft, a motor mounted inside of the hollow frame or casing, means for transmitting motion from the motor to said single crank shaft, and a steering wheel under the forward portion of the hollow frame or casing and in line with the traction wheel.

2. In a motor vehicle of the character described, the combination with a hollow frame or casing provided with oscillatory legs and having the configuration of a horse, a shaft, and means supporting said shaft centrally below the rear portion of the hollow frame or casing and intermediate of the fore and aft legs of the horse, of a traction wheel secured centrally on said shaft, a motor inside of the hollow frame or casing, driving means connecting said motor and shaft, a vertical shaft between the fore legs of the horse, a steering wheel mounted in bearings at the lower end of said vertical shaft and in line with the traction wheel, gearing connected with said vertical shaft, a manually operated shaft connected with said gearing and extending rearwardly beyond the horse for manipulating the steering wheel, and means for transmitting motion from the shaft of the traction wheel to the oscillatory legs.

In testimony whereof, I have signed this specification in the presence of two subscribing witnesses.

SEYMOUR STEWART.

Witnesses:
 ROBERT H. LANGLEY,
 REGIS O'CONNOR.

Copies of this patent may be obtained for five cents each, by addressing the "Commissioner of Patents, Washington, D. C."